United States Patent [19]

Kispert et al.

[11] 4,262,979
[45] Apr. 21, 1981

[54] MULTI-PART PLASTIC CAGE FOR ROLLING BEARINGS

[75] Inventors: Klaus Kispert, Schweinfurt; Hans Meining, Dittelbrunn, both of Fed. Rep. of Germany

[73] Assignee: SKF Kugellagerfabriken GmbH, Schweinfurt, Fed. Rep. of Germany

[21] Appl. No.: 21,809

[22] Filed: Mar. 19, 1979

[30] Foreign Application Priority Data

Apr. 8, 1978 [DE] Fed. Rep. of Germany ... 7810515[U]

[51] Int. Cl.[3] .............................................. F16C 33/38
[52] U.S. Cl. .............................. 308/217; 29/148.4 C
[58] Field of Search ................ 29/148.4 R, 148.4 A, 29/148.4 C; 308/201, 202, 212, 213, 216, 217, 218, 235, 236, 207 R

[56] References Cited

U.S. PATENT DOCUMENTS

| 1,415,420 | 5/1922 | Weibull | 308/217 |
|---|---|---|---|
| 3,387,901 | 6/1968 | Williams | 308/217 |
| 3,944,307 | 3/1976 | Bingle | 308/217 |
| 4,118,259 | 10/1978 | Bingle et al. | 308/217 |
| 4,155,606 | 5/1979 | Kispert et al. | 308/217 |
| 4,174,870 | 11/1979 | Kispert et al. | 308/217 |

*Primary Examiner*—Frederick R. Schmidt
*Attorney, Agent, or Firm*—Daniel M. Rosen; J. David Dainow

[57] ABSTRACT

In a multi-part plastic cage having a comb part with a plurality of axially extending webs adapted to engage a cover part, the cover part has recesses for receiving the ends of the webs, to absorb radial forces. The parts are joined by pins extending from one of the elements into recesses in the other, adapted to be joined by ultrasonic welding at positions spaced from the web ends, so that the pins are subject only to axial loading.

10 Claims, 8 Drawing Figures

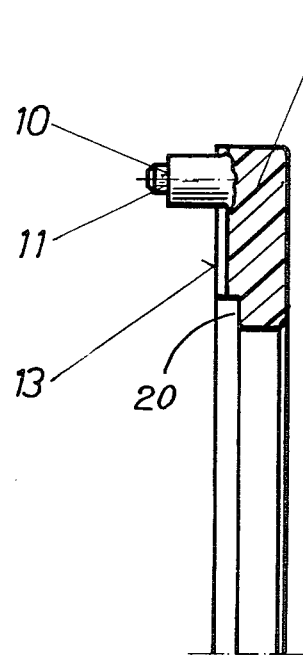
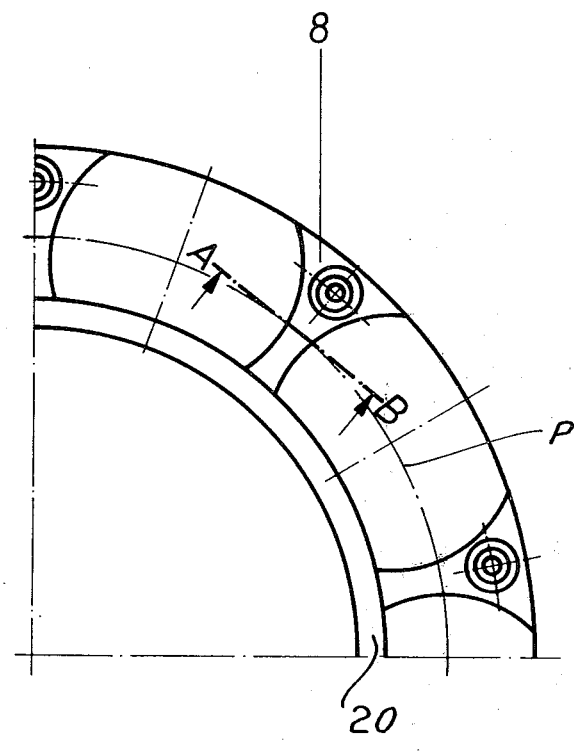
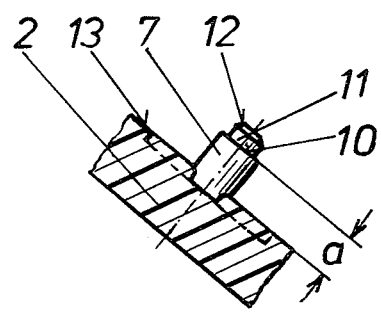

MULTI-PART PLASTIC CAGE FOR ROLLING BEARINGS

BACKGROUND OF THE INVENTION

In multi-part plastic cages which are connected together by ultrasonic welding, and which are strengthened by glass fibers, significant distortion results from the use of the sonotrode of the ultrasonic welding apparatus, as long as the sonotrode stays in direct contact with the melting plastic at the welding point.

It is known that cage parts and covers of plastic cages can be connected together by ultrasonic welding, whereby the free ends of each web or spacer and the opposite lying surface of the cover are provided with either a recess or with a cooperating projection, and that the recesses or apertures have dimensions such that a part of the projection is slidably received by the centering arrangement, so that the projection fills the aperture fully only after the ultrasonic welding process.

In such ultrasonic welding in the production of this type of cage, there are difficulties in that the plastification or plastifizing of the cage material by ultrasonic welding does not result in accurate centering and axial guiding of the cage parts themselves. In the production of the known cages, special arrangements must be provided for the centering and guiding of the cage parts, which causes the production to be more costly. In addition, prior cage connections are unsuitable especially for the reception of larger circumferential and radial forces, since the forces must be absorbed exclusively by the connection pins.

SUMMARY OF THE INVENTION

The present invention is directed to the provision of a multi-part cage, especially a comb cage for radial-roller bearings, in which the connection pins are preferably fabricated unitarily with the cage covers or the like. The invention is directed to the production of such cage parts which can be centered and guided in the axial direction during the ultrasonic welding by forming means, in which the necessary use of energy is minimized by the formation of the contact positions for the welding and a rapid plastification or plasticizing of the material is attained.

The cage in accordance with the invention exhibits a high stability and is suitable for receiving higher forces. In one embodiment of the invention a cage is provided in which, for example, the cage cover is guided in the axial direction both before and during the ultrasonic welding. In another embodiment of the invention a more rapid alignment of the cage webs in the radial direction is achieved. In a further embodiment of the invention hollow spaces are provided in the cage for the reception of excess welding material.

In a still further embodiment of the invention, the connection pins are elastically bendable, so that large radial and circumferentially directed forces acting on the cage will be carried essentially by the recesses adapted to receive the web ends which engage the cover, and not by the connection pins.

BRIEF DESCRIPTION OF THE DRAWINGS

In order that the invention will be more clearly understood, it will now be disclosed in greater detail with reference to the accompanying drawings, wherein:

FIG. 4 is a partially cross-sectional view of a cage cover in accordance with the invention;

FIG. 5 is a part of the side view of the cover of FIG. 4, as seen from the left of FIG. 4;

FIG. 6 is a cross-sectional view of a portion of the cover of FIG. 5 taken along the lines A-B.

DETAILED DESCRIPTION OF THE INVENTION

Figure 1:
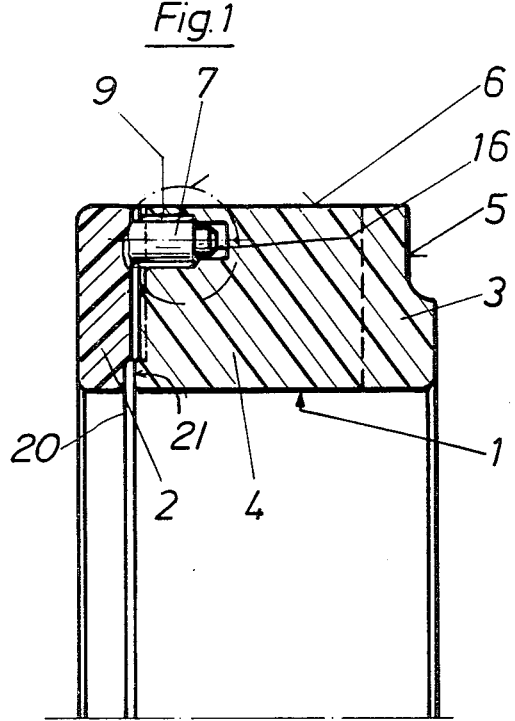
FIG. 1 is a cross-sectional view of a two-part fiber reinforced plastic cage in accordance with the invention, before ultrasonic welding.
Figure 2:
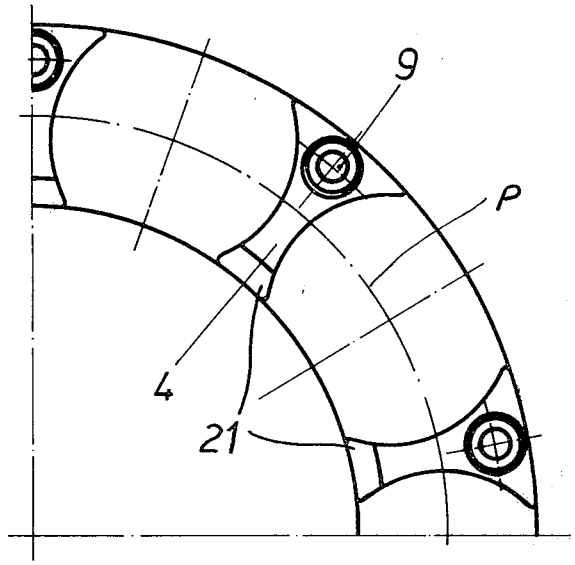
FIG. 2 is a side view of the comb position of the cage of the embodiment of the invention of FIG. 1, taken from the left side of FIG. 1.

The fiber reinforced plastic cage illustrated in FIGS. 1-6, is particularly adapted for cylindrical roller bearings, and is comprised of a comb cage part 1 and a cover 2. These parts are adapted to be connected to one another by ultrasonic welding. The cage side ring 3 of the comb portion of the cage is provided, on the side thereof directed away from the webs or spacers 4, with a circumferentially extending recess 8, which extends from the outer circumferential surface 6 to a position inside of the pitch circle P. This weakening of the cage side ring 3 inhibits the webs 4 from bending greatly inwardly during the formation of the comb cage parts. The cage cover 2 has preformed connection pins 7, which are arranged to extend from the bottoms of the recesses 8 corresponding to the ends of the webs. The pins 7 engage the receiving holes 9 of the cage webs 4.

Each of the connection pins 7 has an annular shoulder 10 and a centering arrangement or pin 11 with an inclined guiding end for simplifying the assembly of the cage parts. The centering pin 11 serves to straighten the radially inwardly pointing cage webs 4 in a normal manner, easily, and axially guides the cage cover 2 before the ultrasonic welding. In order to additionally stabilize the cage parts 1 and 2 in the radial and circumferential directions before the ultrasonic welding, the ends of the webs rest in the recesses 8 of the cover. For this purpose the distance "a" between the annular shoulder 10 of the connection pin 7 and the facing surface 13 of the cage cover 2 (see FIG. 6) is slightly less than the distance "b" between the plane normal to the axis of the bearing which extends to the contact points between the shoulder 10 and the inclined surface 14 of the receiving hole 9 (see FIG. 3) and the facing surface 15 of the cage part 1 which has the receiving hole 9.

The annular shoulder 10 of the connection pin 7 engages the inclined running surface of the receiving hole 9 before the ultrasonic welding together of the cage parts 1 and 2. In the process of ultrasonic welding tfhe contact positions become plasticized by the longitudinal ultrasonic waves, and the cage cover 2 is pressed down against the cage part 1, so that the excess material is directed into the hollow space 16 at the bottom of the receiving hole. This hollow space is provided, since the centering hole 18 is longer than the centering projection 11, and the diameter of the receiving hole 9 is larger than that of the connection pin 7. The welding points between the cage parts 1 and 2 are therefore shifted proportionately farther from the ends of the webs 4, so that the connecting pins can bend elastically and large radially and circumferentially directed forces acting on the cage will be taken up essentially by the recesses 8 of the cover 2.

Figure 3:
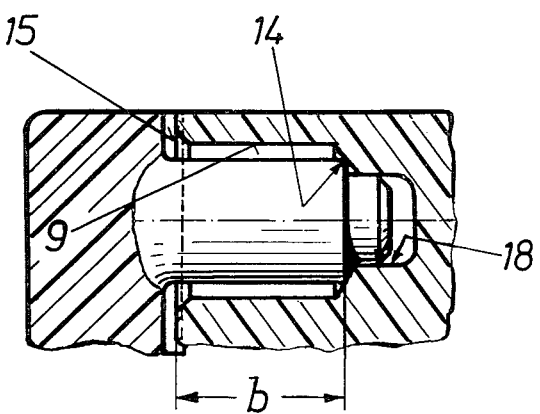
FIG. 3 is an enlarged view of the portion of FIG. 1 in the region of the dash-dot circle of FIG. 1.

In other words, during the initial assembly as shown in FIGS. 1 and 3, the pins 7 are inserted in the holes 9, with the end edges of the pins 7 at the annular shoulders thereof engaging the inclined bottoms of the holes 9. The holes 9, as is most apparent in FIG. 3, have larger diameters than the pins 7, so that a degree of straightening is effected by the engagement of the shoulders of the ends of the pins with the inclined surfaces at the bottoms of the holes 9. The alignment in this regard is held by the projections 11 on the ends of the pins 7, the ends of the projections 11 also being tapered for alignment and ease of assembly. The recesses 18 are axially longer than the projections 11, and are shaped to engage the sides of the projections 11 for centering of the pins 7 during this portion of the assembly. During this portion of the assembly, due to the above noted dimensional relationship, the ends, i.e., end faces, of the webs are held away from the bottoms of the recesses 8, due to the engagement of the shoulders of the pins 7 with the inclined surfaces 14, but, as shown in FIGS. 1 and 3, the web faces or ends will have partly entered the recesses 9 to effect circumferential and radial alignment of the webs and cover 2.

Figure 7:
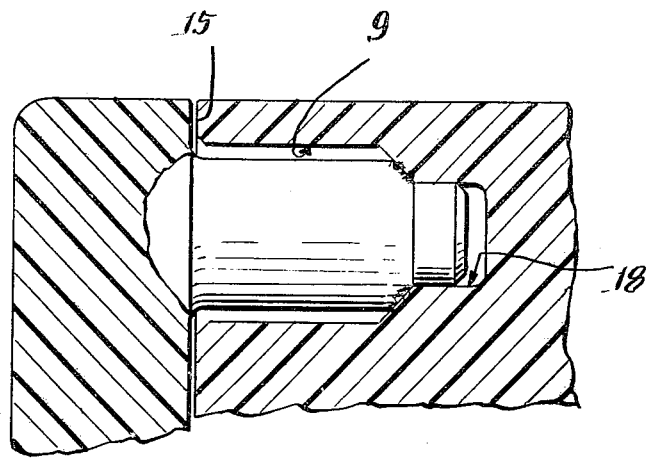
FIG. 7 is a partially cross-sectional enlarged view corresponding to FIG. 3, in which the comb part and cage part have been fused together by ultrasonic welding.

After the ultrasonic welding has been effected, as illustrated in FIG. 7, the end face of the web will engage the bottom of the recess, due to the plastification of the material of the cage during welding. Further, the plastification will have resulted in at least the welding of the pin 7 in the region of the bottom of the hole 9, as well as the forcing of surplus material further into the recess 18. At this time it will be noted that circumferential and radial forces acting on the cage are still absorbed primarily by the interaction between the web ends and the recesses 8, with the joining of the cage parts being effected primarily at the former shoulders of the pins 7, i.e., spaced from the web ends, whereby the bendability of the pins 7 relieves the welded joints from loading by such forces.

In the embodiment of the invention illustrated in FIGS. 1, 2, 4 and 5, an annular recess 20, deeper than the recess 8, is provided in the cover 2, and corresponding projections 21 are provided on the inner edges of the web ends, to be received in the annular recess 20, for further centering of the structure. As illustrated in FIG. 1, however, prior to ultrasonic welding the ends of the projections 21 are spaced from the bottoms of the annular recess 20, whereby this portion of the structure cooperates in the same manner as the recesses 8 for alignment of the cage parts.

Figure 8:
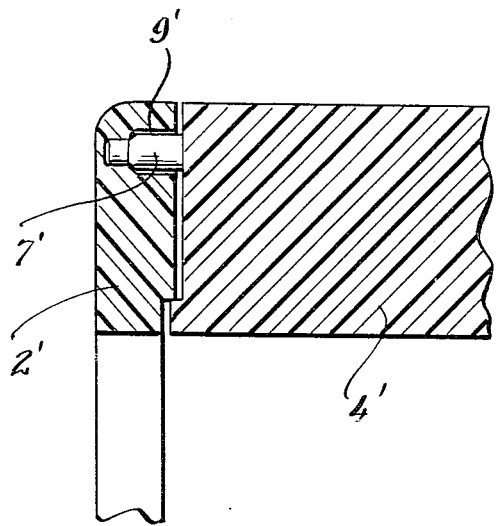
FIG. 8 is a simplified cross-sectional view of a portion of a modification of the embodiment of FIG. 1.

The above-described embodiment constitutes only one example of the invention. Changes in the construction of the individual parts are contemplated within the scope of the invention. For example, the pins 7' alternately could be provided on the webs 4', with the holes 9' in the cover 2', as shown in FIG. 8. Further, the cage in accordance with the invention is not only useful for cylindrical roller bearings, but may be employed for example also in tapered rolling bearings, as well as other types of rolling element bearings.

We claim:

1. In a multi-part plastic cage for rolling bearing elements wherein an axially extending web element has an end engaging a cover element, and a first recess on one of said elements receives a connecting pin extending from the other of said elements, whereby the pin may be ultrasonically welded in said recess; the improvement wherein said cover has a second recess shaped to receive said end of said web for absorbing radial and circumferential forces, the lateral walls of said pin being spaced from the lateral walls of said first recess adjacent said end of said web.

2. The multi-part plastic cage of claim 1 wherein, prior to ultrasonic welding of the parts of the cage together, the first recess has an inclined bottom surface, the pin having a shoulder engaging said inclined surface in a given transverse plane of the cage, wherein the distance between said shoulder and the adjacent facing surface of said other of said elements is slightly less than the distance between said plane and the facing surface of the element into which said recess extends.

3. The multi-part plastic cage of claim 1 wherein said centering pin and recesses are dimensioned to slightly space the end of said web from the bottom of said second recess prior to ultrasonic welding of the parts of said cage together.

4. The multi-part plastic cage of claim 1 wherein said connecting pin has a centering pin on its axial end, and said first recess has a corresponding centering hole for receiving said centering pin.

5. The multi-part plastic cage of claim 4 wherein said centering pin has a guiding inclined surface at its end.

6. The multi-part cage of claim 4, wherein the length of said centering hole is greater than the length of said centering pin, and the diameter of said first recess is greater than that of said connecting pin.

7. The multi-part plastic cage of claim 1 wherein said cage elements are ultrasonically fused together by fusing between said connecting pins and the bottoms of said first recesses, at points spaced from the bottom of said second recess, whereby ultrasonically welded connections between said elements are substantially isolated from circumferential and radial forces acting on said cage.

8. In a multi-part plastic cage for rolling bearing elements wherein an axially extending web element has an end engaging a cover element, and a first recess on one of said elements receives a connecting pin extending from the other of said elements, whereby the pin may be ultrasonically welded in said first recess; the improvement wherein said cover has a second recess shaped to receive said end of said web for absorbing radial and circumferential forces on said cage, and wherein, prior to ultrasonic welding of said elements, said first recess has an inclined bottom, said connecting pin has an annular shoulder engaging said inclined surface in a given transverse plane, the length of said pin between said plane and the adjacent facing surface of said other element being slightly less than the distance between said transverse plane and the facing end surface of said one element.

9. The multi-part plastic cage of claim 8 wherein said connecting pin has a diameter less than the diameter of said first recess.

10. The multi-part plastic cage of claim 9 wherein a centering pin is provided on the free end of said connection pin and has a diameter less than that of said connection pin, and wherein said first recess has a further recess at its bottom for receiving said centering pin, said further recess having a length greater than that of said centering pin.

* * * * *

UNITED STATES PATENT AND TRADEMARK OFFICE
CERTIFICATE OF CORRECTION

PATENT NO. : 4,262,979

DATED : April 21, 1981

INVENTOR(S) : Klaus Kispert

It is certified that error appears in the above—identified patent and that said Letters Patent is hereby corrected as shown below:

Col. 1, line 37, after "multi-part" insert -- plastic --.

Signed and Sealed this

Twenty-seventh Day of September 1983

[SEAL]

Attest:

GERALD J. MOSSINGHOFF

Attesting Officer

Commissioner of Patents and Trademarks